J. C. Baker,
Seed Planter,
Nº 23,069. Patented Mar. 1, 1859.
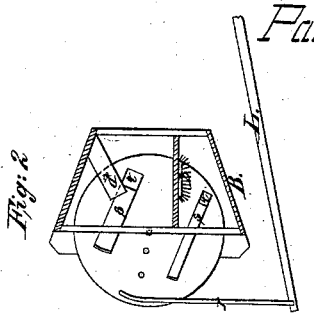
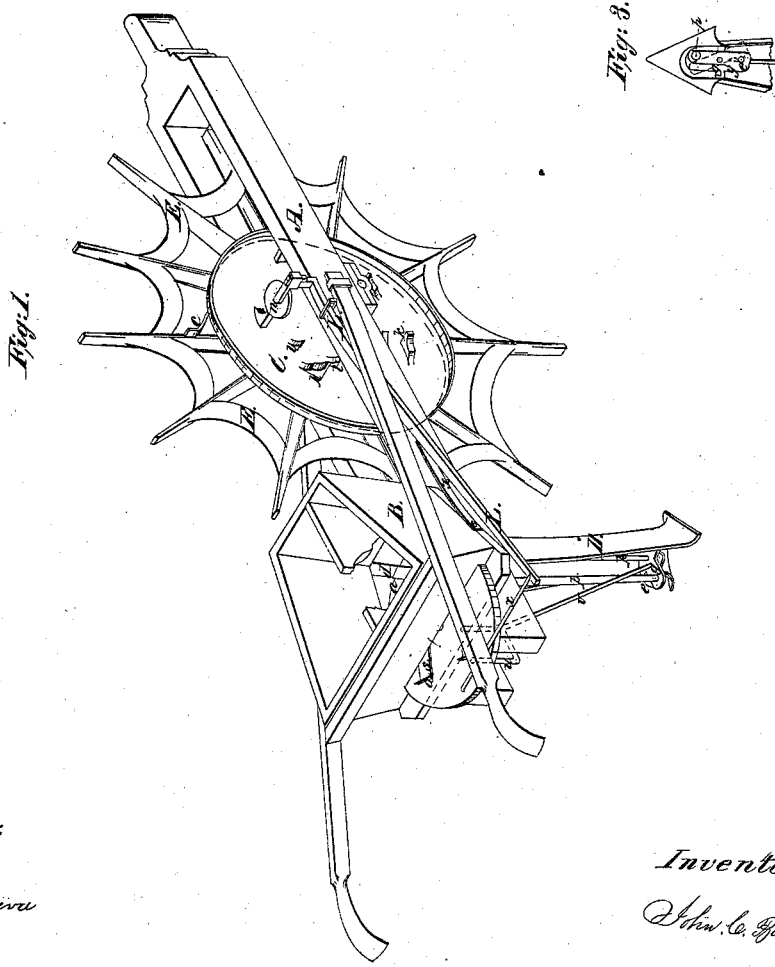
Witnesses:
A. Staley
Nathan'l Seivu
Inventor:
John C. Baker

UNITED STATES PATENT OFFICE.

JOHN C. BAKER, OF MECHANICSBURG, OHIO.

IMPROVEMENT IN SEED-PLANTERS.

Specification forming part of Letters Patent No. 23,069, dated March 1, 1859.

*To all whom it may concern:*

Be it known that I, JOHN C. BAKER, of Mechanicsburg, in the county of Champaign and State of Ohio, have invented a new and useful Improvement in Seed Planters; and I do hereby declare the following to be a full, clear, and exact description thereof, reference being had to the accompanying drawings and the letters of reference marked thereon, making part of this specification.

Similar letters refer to like parts.

My invention relates to certain improvements in seed-planters, hereinafter described, by which I am enabled to plant the seed in drills or in hills at regular intervals, and at the same time to deposit a fertilizer immediately over the planted seed.

Figure 1 is an isometrical view of my improvement. Fig. 2 is a plan of the seed-hopper and vibrating feed-disk, shown as being detached from the planter. Fig. 3 is a bottom view of the seeding and fertilizing tubes and vibrating cut-off.

A is the frame of the planter.

E is a spur-wheel, the spokes or spurs being exposed at their ends to insure rotation as the planter is moved forward.

C is a ratchet-wheel, made to rotate upon the same axis as the wheel E, and is provided with a ratchet, O, in red dotted lines upon its inner face, so that it can be made to rotate forward in harmony with the spur-wheel E by means of the spring-dog $c$. Upon the outer face of the ratchet-wheel C are an outer and inner series of cams, $k$ $l$, the intervals between the cams of each series being arranged with reference to the space required between the deposits of seed, the outer series, $k$, being used for hilling and the inner series, $l$, for drilling seed. The peculiar form of the cam $k$ is made to impart double action to the lever L with reference to the operation of the vibrating cut-off $e$, by means of which the fertilizer may be deposited immediately upon or over the planted seed.

$n$ is an adjustable friction-roller, arranged upon the lever L in such manner that it may be adjusted to either series of cams $k$ $l$.

H is a spring formed to press constantly against the inner side of the lever L and return its rear end outwardly whenever its forward end is free from the cams.

B is a seed-hopper formed with two compartments, the larger being designed to contain fertilizers and the smaller seed to be planted.

$a$ (fully shown in Fig. 2,) is a vibrating feeding-disk, provided with apertures $t$ $t$, through which the seed and fertilizer may pass to the tubes $p$ $p$.

$s$ are valves for regulating the quantity of seed or fertilizer planted. The disk $a$ is made to receive vibratory motion from the lever L by means of the rod $r$.

$p$ $p'$ are conducting-tubes, the former made to communicate with the seed-compartment and the latter with that of fertilizer. Both the tubes are attached to and made to pass through the support $g$, which is attached to the plow D.

The double vibrating cut-off $e$ is attached firmly at its center to the rod $u$, and has a projection, $y$, at its heel. (Fully shown in Fig. 3.) The cut-off $e$ is made to vibrate in harmony with the disk $a$ by means of the rod $u$, the upper end of which passes through a slot in the disk $a$.

The seed for planting being placed in the seed-compartment and a fertilizer in the other compartment, and the friction-roller $n$ being adjusted to the cams $k$, and the planter made to move forward, the roller $n$ rises upon the first elevation of the cam $k$ and the cut-off $e$, by means of the lever L, rod $r$, disk $a$, and rod $u$, is made to vibrate sufficiently to expose the bottom of the seeding-tube $p$, the tube $p'$ being still closed by the projection $y$ of the cut-off $e$. The planter still continuing to move forward, the roller $n$ rises the second elevation of the cam $k$, and the cut-off $e$, by means above described, is fully operated, the bottom of the tube $p'$ exposed, and the fertilizer deposited nearly upon or over the planted seed.

What I claim as my invention, and desire to secure by Letters Patent, is—

The arrangement of the wheels E and C, cams $k$ $l$, lever L, friction-roller $n$, and disk $a$, the whole being constructed as and for the purposes set forth.

JOHN C. BAKER.

Witnesses:
   A. STALEY,
   NATHANIEL SEEVA.